United States Patent
Frank et al.

(10) Patent No.: US 6,999,978 B2
(45) Date of Patent: Feb. 14, 2006

(54) DATA BACKUP METHOD

(75) Inventors: Claus-Andreas Frank, Munich (DE);
Guenther Mohr, Olching (DE);
Gerhard Sommer, Baierbrunn (DE);
Hok-Tjhoen Tan, A-Wien (AT)

(73) Assignee: Siemens Aktiengellschaft, Munich (DE)

( * ) Notice: Subject to any disclaimer, the term of this patent is extended or adjusted under 35 U.S.C. 154(b) by 531 days.

(21) Appl. No.: 10/183,025

(22) Filed: Jun. 27, 2002

(65) Prior Publication Data

US 2003/0041075 A1    Feb. 27, 2003

(30) Foreign Application Priority Data

Jun. 28, 2001  (EP) ................... 01115831

(51) Int. Cl.
   *G06F 17/30*   (2006.01)
(52) U.S. Cl. .................................... 707/204
(58) Field of Classification Search .............. 707/204; 711/162
   See application file for complete search history.

(56) References Cited

U.S. PATENT DOCUMENTS

| | | | |
|---|---|---|---|
| 5,163,148 A | | 11/1992 | Walls ......................... 707/204 |
| 5,241,670 A | | 8/1993 | Eastridge et al. .............. 714/1 |
| 5,664,186 A | * | 9/1997 | Bennett et al. ............. 707/204 |
| 5,684,991 A | * | 11/1997 | Malcolm .................... 707/204 |
| 5,963,634 A | * | 10/1999 | Kantola et al. ............. 379/279 |
| 6,078,932 A | * | 6/2000 | Haye et al. ................. 707/204 |
| 6,460,055 B1 | * | 10/2002 | Midgley et al. ............ 707/204 |

FOREIGN PATENT DOCUMENTS

EP   0921466 A1   6/1999

* cited by examiner

Primary Examiner—Jack M. Choules
(74) Attorney, Agent, or Firm—Morrison & Foerster LLP

(57) ABSTRACT

During backup of a database's data stored in individual files, it is not permissible for the data in the individual files to be altered, for reasons of consistency. For this reason, the files are blocked to altering access operations after a particular time during a backup operation. According to the invention, the backup operation is carried out in two parts. First, the files are transferred without there being any alteration block. A recording file is used to note files which are altered during transferring. These files are transferred again in a second part. During the second part an alteration block is required. It can be assumed that the number of files needing to be transferred in the second part is much smaller than the number of files needing to be transferred in the first part. For this reason, a significantly shortened alteration block is achieved.

7 Claims, 1 Drawing Sheet

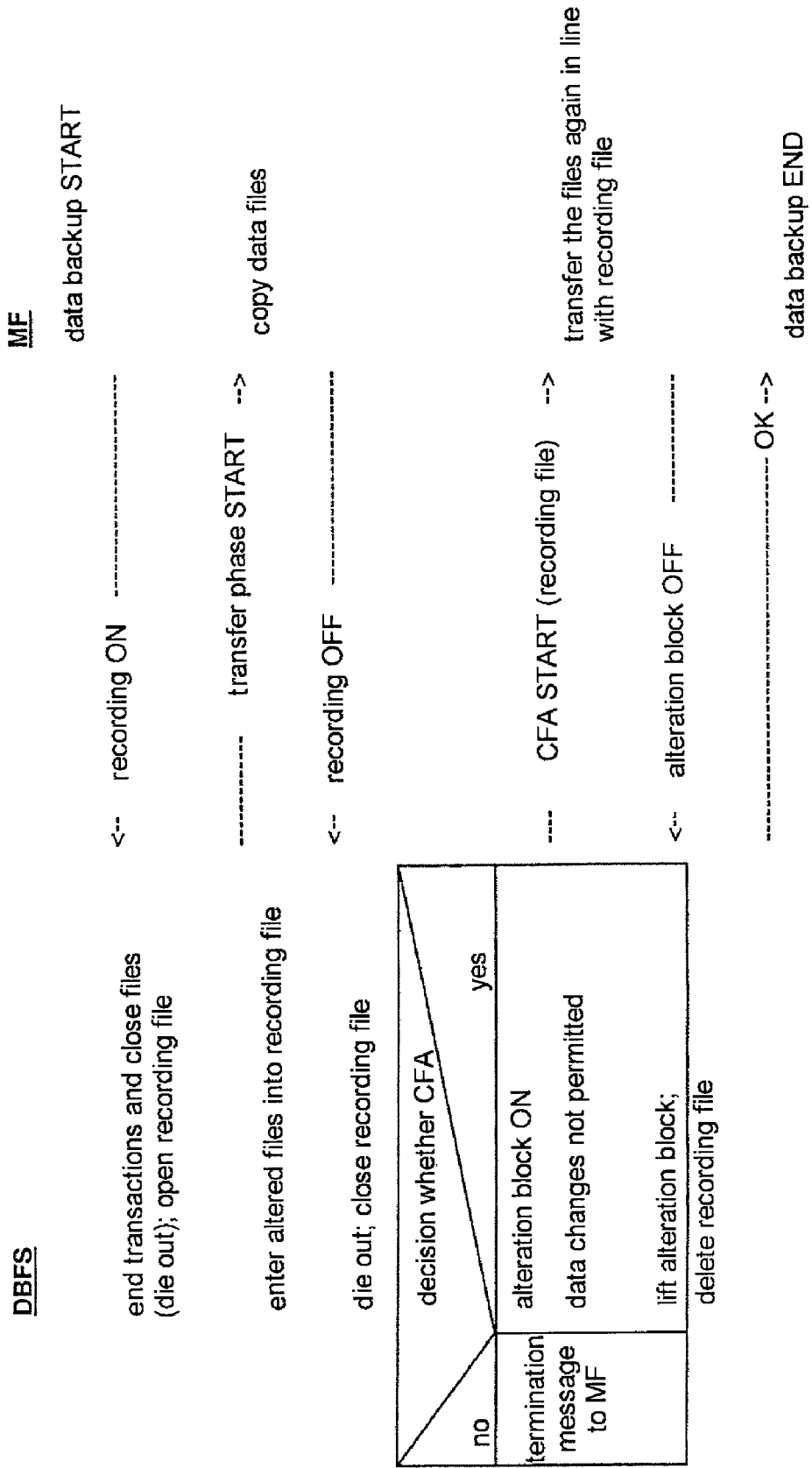

DATA BACKUP METHOD

CLAIM FOR PRIORITY

This application is based on European application 01115831.8 filed 28 Jun. 2001.

TECHNICAL FIELD OF THE INVENTION

This invention relates to backup of data, and in particular, to backing up data stored in individual files.

BACKGROUND OF THE INVENTION

During backup of a database's data stored in individual files, it is not permissible for the data in the individual files to be altered, for reasons of consistency. For this reason, the files are blocked to altering access operations after a particular time during a backup operation. When the files have been copied, the block is lifted again.

As the size of the database increases, the time required for such a backup operation increases. This results in the performance and operability of the system accessing the individual files of the database being impaired during a backup operation.

To avoid this problem, it is possible to use a method which, although permitting the alterations, does not incorporate them into the files of the database to be backed up during the backup operation. Rather, it creates a separate recording file which would be incorporated into the database's files when the backup operation has ended. During processing of the first recording file, it would have to be assumed that there are alterations to the files of the database. For reasons of consistency, these alterations would not be able to be made until after all the alterations from the first recording file had been incorporated, and would therefore need to be captured in a second recording file. The method would become unstable if the second recording file were to grow faster than the first recording file could be processed.

One problem in connection with data backup is that of shortening the duration of the block required for the entire database while the files are being copied such that instabilities do not arise, without restricting the scope of the backup operation in doing so.

SUMMARY OF THE INVENTION

The present invention discloses a data backup system and method which requires the shortest possible alteration block for the data which are to be backed up.

One advantage of the invention is that the performance and operability of the system accessing the database are not impaired during the first part of the process. The additional complexity for creating the recording file is negligible. During the second part of the process a block on the data to be backed up is necessary. In this embodiment, the number of files needing to be transferred in the second part is much smaller than the number of files needing to be transferred in the first part. For this reason, the invention achieves a significantly shortened alteration block.

In accordance with advantageous embodiment, a parameter, for example the number of files altered during the first part or the sum of the sizes of the files altered during the first part, can be used in order to prevent the alteration block from needing to be maintained too long during the second part on account of an excessively large volume of data to be transferred.

In accordance with still another advantageous embodiment of the invention, a maximum length of time for the second part can be provided. If this length of time is exceeded, e.g. on account of high system load or higher-priority processes, the data backup is terminated in order to prevent the alteration block from needing to be maintained too long.

In accordance with further advantageous embodiments, the inventive method may be used for backing up databases in a switching system.

BRIEF DESCRIPTION OF THE DRAWINGS

The invention is explained in more detail below with reference to the drawing, in which FIG. 1 shows an exemplary procedure of the Copy File Again method for backing up files in a database.

DETAILED DESCRIPTION OF THE PREFERRED EMBODIMENTS

FIG. 1 shows an exemplary procedure of the CFA (Copy File Again) method for backing up files in a database DB whose individual files are stored on a database file server DBFS. The data backup is initiated by a management function MF.

The data backup proceeds as follows:

(1) Time control or user input prompts the performance of data backup in MF.
(2) MF signals to DBFS that DBFS needs to enter the recording mode.
(3) DBFS ends pending transactions and closes open files. This operation is called the die-out phase.
(4) DBFS opens the recording file used to note the files altered from now on.
(5) DBFS signals to MF that the data to be backed up can start to be transferred.
(6) Following conclusion of the transfer of the data to be backed up, MF signals to DBFS that the recording mode can be terminated.
(7) DBFS performs a second die-out phase and closes the recording files.
(8) DBFS checks whether it is possible to perform CFA, i.e. copying of the—altered—files again. The criteria available are the number or the total data volume of the files noted in the recording file. If evaluation of the recording file gives a value smaller than the chosen criterion, the operation is continued with CFA, otherwise it is terminated at this point, the backup performed hitherto is discarded, and the recording file is deleted.
(9) DBFS activates the data alteration block.
(10) DBFS signals to MF that it needs to start the CFA, i.e. copying of the files again using the recording file. To this end, DBFS delivers the recording file to MF, so that MF can transfer files included in this list again.
(11) MF transfers the files. The following mechanism can optionally be used: if DBFS establishes that the file transfer and hence the alteration block is taking longer than a prescribed time, e.g. on account of high system load, the operation is terminated at this point, the backup performed hitherto is discarded, and the recording file is deleted.
(12) Following conclusion of the transfer of the files to be transferred again, MF signals to DBFS that the alteration block can be lifted.
(13) DBFS changes to the normal operating mode and deletes the recording file for the next data backup.

What is claimed is:

1. A method of backing up data for data stored over a plurality of files on a working medium in a data processing system, comprising:

transferring the data to be backed up from the working medium to a backup medium, wherein the data on the working medium may be changed during the transferring and the changes to the data during the transferring are stored separately in a recording file; and complementing the data transferred to the backup medium with the modifications made during the transferring, wherein modifications to the data to be backed up are prevented during the complementing.

2. The method as claimed in claim 1, wherein, if a prescribed value is exceeded for a parameter reflecting the quantity of changes made during the transferring, the data backup is terminated and the complementing is not performed, the data transferred and the information in the recording file are discarded, and the data backup is restarted after a determined time period.

3. The method as claimed in claim 1, wherein, if a prescribed maximum length of time for the complementing is exceeded, the complementing is terminated and an alteration block, which prevents modifications to the data to the data to be backed up, is lifted, the data transferred and the information in the recording file are discarded, and the data backup is restarted after a determined time period.

4. The method as claimed in claim 1, wherein the data to be backed up are databases in a switching system.

5. The method as claimed in claim 2, wherein, if a prescribed maximum length of time for the complementing is exceeded, the complementing is terminated and an alteration block, which prevents modifications to the data to be backed up, is lifted, the data transferred and the information in the recording file are discarded, and the data backup is restarted after a determined time period.

6. The method as claimed in claim 2, wherein the data to be backed up are databases in a switching system.

7. The method as claimed in claim 3, wherein the data to be backed up are databases in a switching system.

* * * * *